(12) United States Patent
Faass et al.

(10) Patent No.: US 6,279,210 B1
(45) Date of Patent: Aug. 28, 2001

(54) ELEMENT FOR SECURING A BODY INTO A WALL

(75) Inventors: Manfred Faass, Pfinztal; Michael Schneider, Karlsbad, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,791

(22) PCT Filed: May 28, 1998

(86) PCT No.: PCT/DE98/01459

§ 371 Date: Dec. 13, 1999

§ 102(e) Date: Dec. 13, 1999

(87) PCT Pub. No.: WO99/02868

PCT Pub. Date: Jan. 21, 1999

(30) Foreign Application Priority Data

Jul. 11, 1997 (DE) .............................. 197 29 736

(51) Int. Cl.⁷ .................. A44B 21/00; F16B 9/00
(52) U.S. Cl. .................. 24/457; 24/459; 403/326
(58) Field of Search .................. 24/457, 115 R, 24/456, 458, 459, 704.1; 403/326; 277/434, 637

(56) References Cited

U.S. PATENT DOCUMENTS

| | | | | |
|---|---|---|---|---|
| 3,295,806 | * | 1/1967 | Modeme | 24/115 R |
| 4,752,178 | * | 6/1988 | Greenhill | 403/326 |
| 4,971,121 | * | 11/1990 | Guertin | 141/392 |
| 5,207,462 | * | 5/1993 | Bartholomew | 403/326 |
| 5,497,536 | * | 3/1996 | Hart | 24/459 |
| 5,890,831 | * | 4/1999 | Kato | 403/329 |

FOREIGN PATENT DOCUMENTS

| | | | |
|---|---|---|---|
| 38 12 182 | 10/1989 | (DE) . | |
| 0 818864 | 1/1998 | (EP) . | |
| 1072849 | * 9/1954 | (FR) | 24/457 |
| 2591450 | 6/1987 | (FR) . | |
| WO 96 14512 | 5/1996 | (WO) . | |

\* cited by examiner

Primary Examiner—Victor N. Sakran
(74) Attorney, Agent, or Firm—Kenyon & Kenyon

(57) ABSTRACT

An attachment element for a body in a wall. The attachment element has a substantially tubular rigid region for receiving the body, and a flexible region for adaptation to a non-flat contour of the wall. The two regions are joined to one another via at least one elastic intermediate piece.

11 Claims, 2 Drawing Sheets

ELEMENT FOR SECURING A BODY INTO A WALL

BACKGROUND INFORMATION

The present invention related to an attachment element for a body that can be inserted into a hole in a wall. German Published Patent Appln. No. 38 12 182 A1 describes a known attachment element, in which an ultrasonic transducer with a cylindrical body is inserted, for attachment, through a hole in a bumper of a motor vehicle, and retained from the back side by a resilient element to prevent it from falling out. It has been found that an attachment element of this kind can be installed only within a limited installation angle with respect to the wall. Given the variety of different vehicle models and the fact that the installation locations of the ultrasonic transducer also differ from one manufacturer to another, very different angles of inclination of the ultrasonic transducer with reference to the road then occur, so that various attachment elements are necessary depending on the vehicle model, which in turn increases the number of attachment elements to be produced.

International Patent Publication No. WO 96/14512 describes an attachment element in which mutually interengaging snap hooks are arranged between the attachment element and the sensor, which latter can be inserted through a hole into a wall. A portion of the attachment element is elastically deformable such that the mutually interengaging snap hooks, release from one another as the elastic portion of the attachment element deforms, and the attachment element is removable from the body.

It is thus usual, in order to install a body in a wall, for example, an ultrasonic sensor in a bumper, to use an attachment element which receives the sensor and which can then be inserted into a hole in the bumper. The attachment element can be anchored in the motor vehicle in various fashions. As already described above, retention can be accomplished by spring force, which has the advantage that the component can readily be detached again. It is also known to anchor the attachment element in the bumper by ultrasonic welding.

SUMMARY OF THE INVENTION

The attachment element according to the present invention has, in contrast to the known existing art, the advantage that the body to be attached by way of the attachment element can be installed in a wall having any desired curvature. The fact that the attachment element includes a flexible region for adaptation to the wall and a rigid region for receiving the body to be attached has the advantage that an attachment element can be used in many ways because it is adaptable and at the same time dimensionally stable. The provision of an elastic intermediate piece for joining the rigid and the flexible regions of the attachment element moreover has the advantage that any force acting on the rigid region can be absorbed elastically. Lastly, it is thereby possible to flexibly handle differences between the contact surface and attachment element.

It is particularly advantageous that the degree of flexibility can be established by way of the groove depth between the individual ridges.

Because of its flexible region, the attachment element can optimally conform to the wall so that the attachment element can be joined very effectively to the wall by adhesive bonding, for example, using a double-sided adhesive system. Because of the flexibility, no peeling effect occurs at the joining point, so that the mechanical loading experienced by the adhesive joining is insignificant or absent.

The provision of spacers at the corners of the attachment element offers the advantage that very good alignment and adjustment of the attachment element is possible prior to final attachment to the wall.

A further advantage exists because of the provision of a collar to receive the body that is to be installed, since no additional devices are necessary in order to center the body being attached in the attachment element.

Lastly, in the event of a replacement or a repair that has become necessary, it is easily possible to take the body out of the attachment element toward the rear, thereby substantially reducing the complexity and thus cost of replacement.

DETAILED DESCRIPTION

Figure 1:
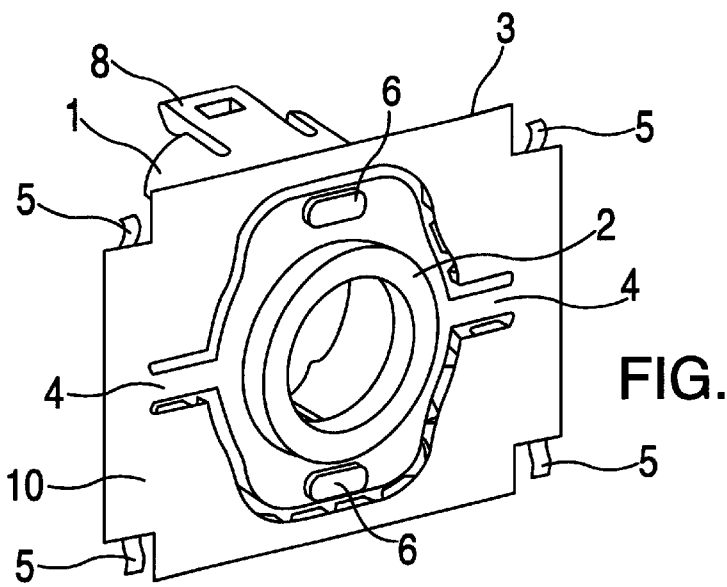
FIG. 1 shows an attachment element according to the present invention in a perspective depiction, obliquely from the front.

FIG. 1 shows the attachment element according to the present invention in a perspective depiction, obliquely from the front. The attachment element includes two parts.

The first part has a solid or rigid region I for receiving the body to be attached (not depicted here). Rigid region 1 is substantially tubular and is delimited toward the front by a collar 2. The body to be attached is inserted from the back side into the tubular segment of rigid region 1. A stop 7 provided on rigid region (shown in FIG. 2) determines the insertion depth of the body to be attached, and thus dictates the defined installation location. Rigid region 1 moreover has resilient tabs 8 which protect the inserted body, for example a sensor for distance measurement, from falling out. The body to be attached is thus secured in the rigid region 1 of the attachment element.

Collar 2 which delimits rigid region 1 toward the front ensures that no additional devices for centering are necessary in the attachment element in order to install the body to be attached. Collar 2 is configured so that it closes off that wall of the hole in which the body to be attached (not depicted here) is to be received. As a result, besides a cylindrical hole in the wall, no additional elements are necessary in order to secure the attachment element.

Figure 2:
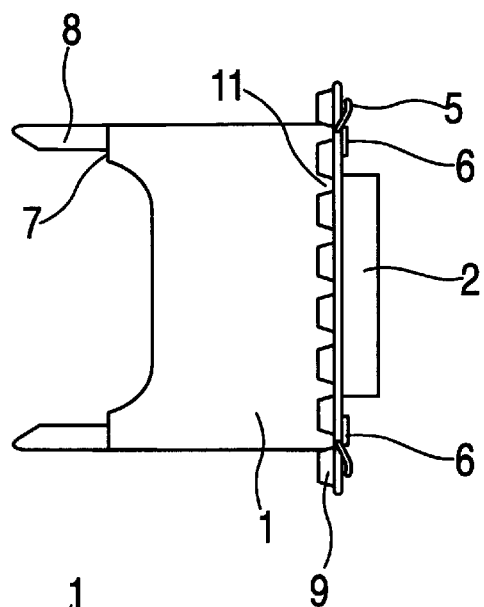
FIG. 2 shows the attachment element according to the present invention in a side view.
Figure 3:
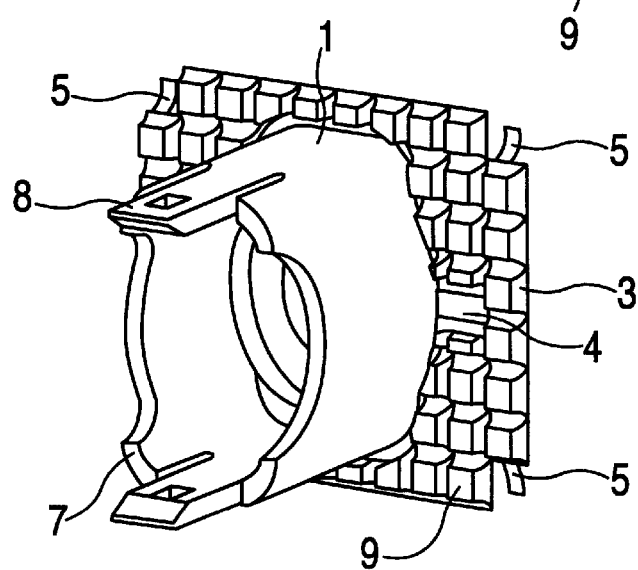
FIG. 3 shows the attachment element according to the present invention in a perspective depiction, obliquely from the rear.

The second part is a flexible region 3 which will be explained in more detail below with reference to FIGS. 2 and 3. In all the Figures, identical components are given identical reference characters, so that each component will not be explained again in detail each time. Flexible region 3 of the attachment element comprises contact surface 10. Located on the back side of contact surface 10 is a knob structure which, in the exemplary embodiment, comprises a plurality of block-like knobs 9. The configuration of this knob structure is not limited, however, exclusively to block-like knobs 9; conical, cylindrical, semi-spherical, or other forms are also conceivable for the individual knobs 9. Located respectively between the individual knobs 9 is a groove 11, the flexibility of flexible region 3 being adjustable via the depth of the individual grooves 11 between knobs 9. The greater the groove depth, the greater the flexibility of this component. In the case of the attachment element according to the present invention, contact surface 10 with its structured back side is substantially rectangular, other shapes being conceivable here as well. Provided at each of the corner points of contact surface 10 are spacers 5 which allow the attachment element to be aligned and adjusted. The stability of spacers 5 is designed to be such that when contact surface 10 is pressed onto the installation surface (not depicted here), they can be slightly pushed backward.

Rigid region 1 and flexible region 3 are joined by an elastic intermediate piece 4 which surrounds the rigid region and is mounted in such a way that it is joined at two points to flexible region 3. Preferably two contact points 6, with which the installation depth of the collar 2 in the wall can be set, are provided on rigid region 1.

Figure 4:
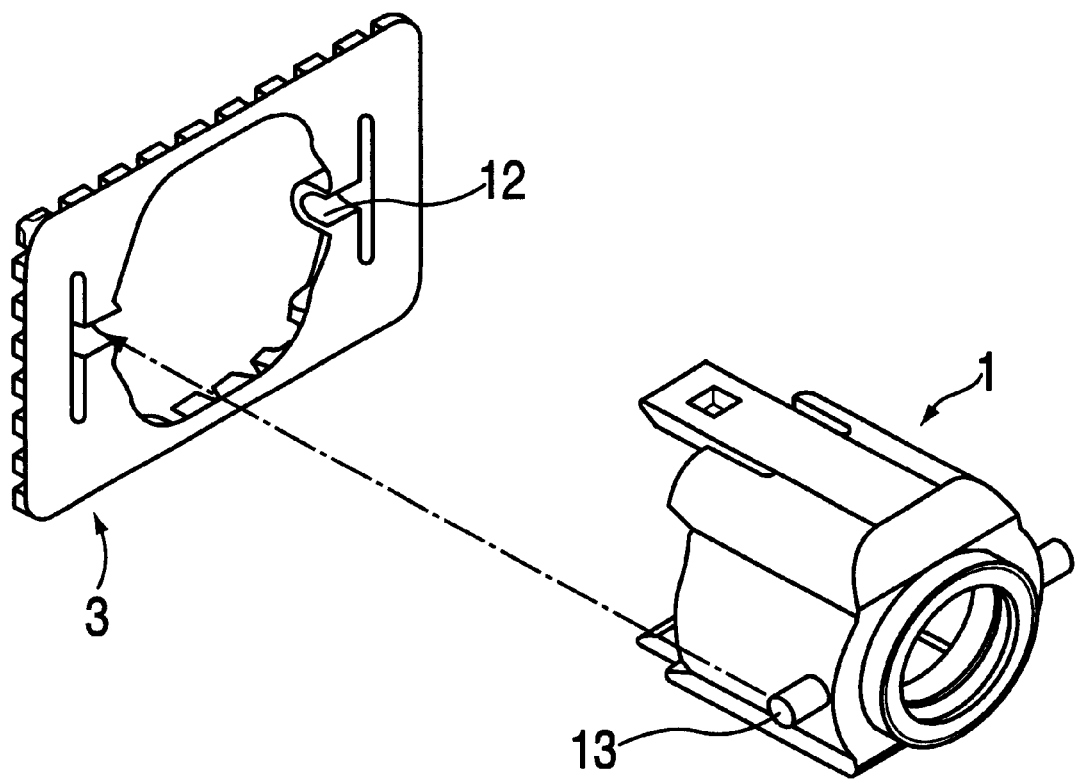
FIG. 4 shows an illustration of the two regions of the attachment element of the present invention being fitted together in a detachable manner.

The joining between rigid region 1 and flexible region 3 can be accomplished permanently or detachably. FIG. 4 shows, in contrast to FIG. 1 with the permanent joining depicted therein by way of elastic intermediate pieces 4, a detachable joining. Flexible region 3 has, in the region of its cutout for receiving the rigid region 1, two half-shells 12. Pegs 13, supported in half-shells upon assembly, are provided on rigid region 1. The two regions 1, 3 are joined via a rotatable articulated joining, half-shells 12 also being elastic. This detachable joining has the advantage that a flexible standard part can be used. The joining becomes more stable, and because of the rotation capability, the flexible region 3 can be better adapted to the surface being attached.

For attachment, contact surface 10 of the flexible region 3 can be adhesively bonded in planar fashion to the inner surface of the wall on which the attachment part is applied.

In the completely installed state, the outer wall, collar surface, and surface of the body to be installed usually form a flat surface.

What is claimed is:

1. An attachment element for a body in a wall, comprising:
    a rigid region having a substantially tubular shape to receive the body;
    a flexible region capable of adaptation to a non-flat contour of the wall; and
    an elastic intermediate piece for joining the rigid region and the flexible region at a predefined point;
    wherein:
        the flexible region includes a contact surface,
        the contact surface includes a back side on which is disposed a knob structure having a plurality of knobs, and
        a flexibility of the flexible region is adjustable on the basis of a groove depth between individual knobs of the plurality of knobs such that the flexibility of the flexible region increases as the groove depth becomes greater.

2. An attachment element for a body in a wall, comprising:
    a rigid region having a tubular shape configured to receive the body;
    a flexible region adaptable to a non-flat contour of the wall; and
    an elastic intermediate piece joining the rigid region and the flexible region at a predefined point.

3. The attachment element according to claim 2, wherein the rigid region includes:
    a circular collar for receiving the body, and
    a stop defining an installation depth for the body in the rigid region.

4. The attachment element according to claim 3, wherein the rigid region includes at least two contact points for establishing an installation depth of the circular collar in the wall.

5. The attachment element according to claim 2, wherein the rigid region includes resilient tabs for preventing the body from falling out of the attachment element.

6. The attachment element according to claim 2, wherein the elastic intermediate piece surrounds the rigid region and is joined to the flexible region at at least two points.

7. The attachment element according to claim 2, wherein the flexible region is capable of adaptation to a curved contour of the wall.

8. The attachment element according to claim 2, further comprising a rotatable articulated joint connecting the rigid region and the flexible region via the elastic intermediate piece.

9. The attachment element according to claim 2, wherein the rigid region includes a collar for receiving the body, the collar being configured so that the wall, the collar and the body define a flat surface in a completely installed state.

10. The attachment element according to claim 2, wherein the flexible region includes a contact surface, and the contact surface includes a back side on which is disposed a knob structure having a plurality of knobs.

11. The attachment element according to claim 2, wherein the flexible region includes a contact surface, a contour of the contact surface being capable of adaptation to the non-flat contour of the wall.

* * * * *